United States Patent [19]
Kephart et al.

[11] Patent Number: 6,026,445
[45] Date of Patent: Feb. 15, 2000

[54] SYSTEM AND METHOD FOR SAVING AND REUSING RECENTLY ACQUIRED NAME TO ADDRESS MAPPINGS

[75] Inventors: George Andrew Kephart; John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 08/972,068

[22] Filed: Nov. 17, 1997

[51] Int. Cl.$^7$ ...................................................... G06F 13/00
[52] U.S. Cl. .............................................................. 709/245
[58] Field of Search ....................... 364/DIG. 1 MS File, 364/DIG. 2 MS File; 709/200, 201, 203, 206, 209, 212, 219, 225, 229, 236, 239, 245; 711/1, 113, 118, 121, 126, 133, 136

[56] References Cited

U.S. PATENT DOCUMENTS

| | | | |
|---|---|---|---|
| 5,349,643 | 9/1994 | Cox et al. ................................... | 380/25 |
| 5,774,660 | 6/1998 | Brendel et al. .......................... | 709/201 |

OTHER PUBLICATIONS

Sun Microsystems, Sunos. 1215, SunOs Manpage for IPAL-LOCD (8C), Dec. 4, 1987.
IBM TDB, Efficient Scheduling Mechanism for Distributed Computing Environment, Jul. 1994, vol. 37, No. 07, pp. 533–536.

*Primary Examiner*—Robert B. Harrell
*Attorney, Agent, or Firm*—Leslie A. Van Leeuwen; Thomas E. Tyson

[57] ABSTRACT

The present invention is a system, method, and computer readable medium for saving and reusing recently acquired Internet addresses. When a client computer receives an Internet address for a particular computer name, the computer name and its corresponding Internet address are saved in a client memory area. Before sending a request to a name server, the client memory is checked to determine if the desired computer name and corresponding Internet address are stored in the client memory. If so, the stored Internet address is used to access the desired machine. If the desired computer name and corresponding Internet address are not stored in the client memory, the requested computer name is sent to the name server for conversion. The name server passes the Internet address back to the client, where it is used to access the machine, and is also stored in the client memory for future use. The client memory area may be configured such that each user has his or her own private memory area where only that user's name/address pairs are stored. In this case, name/address pairs are stored in individual user memory areas, rather than a client memory area. The present invention allows up-to-date Internet addresses to be obtained quickly and efficiently. Further, if a client determines that a name server is unavailable, the client may continue to use stored Internet addresses, and thus access desired computers, even though the name server is off line.

15 Claims, 5 Drawing Sheets

SYSTEM AND METHOD FOR SAVING AND REUSING RECENTLY ACQUIRED NAME TO ADDRESS MAPPINGS

FIELD OF THE INVENTION

The present invention relates to the field of information handling systems, and, more particularly, to a system and method for saving and reusing name to address mappings returned from a name server.

BACKGROUND OF THE INVENTION

In network computer systems, a plurality of client computers are typically connected together, and to one or more server computers in the network. A network may be established through the hard-wired interconnection of a plurality of clients and servers in a local network, or on a wider scale such as an intranet, or the Internet or World Wide Web, which may include telecommunication links. In any case, the clients and servers may act as central control units for providing access to files, programs, and program execution to the individual computers connected within the network.

Each computer (i.e. each client machine and each server machine) has a unique address, referred to as the machine's Internet address, or IP address. These terms are often used interchangeably. Note that TCP/IP (Transmission Control Protocol over Internet Protocol) is both a transport layer and a network layer protocol developed for networking systems. A machine's Internet address (i.e. IP address) is a 32-bit address defined by the Internet Protocol, and is typically expressed in dot notation (e.g., 123.456.7.8).

In the interest of being user-friendly, network systems usually allow clients to access other clients and servers through the use of alphanumeric names. The World Wide Web is one example of a system in which clients use alphanumeric names to reach other machines, such as Web servers. The World Wide Web is the Internet's multimedia information retrieval system. In the Web environment, client machines communicate with Web servers using the Hypertext Transfer Protocol (HTTP). HTTP is an application protocol providing users access to files (e.g., text, graphics, images, animation, sound, video, etc.) using a standard page description language known as Hypertext Markup Language (HTML). HTML provides basic document formatting and allows a developer to specify links to other computers and files.

In the Internet paradigm, a network path to a server is identified by a Uniform Resource Locator (URL) having a specified syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

One example of a URL is http://www.ibm.com. In this example, "http" refers to the Hypertext Transfer Protocol discussed above. Following the two slashes is "www.ibm.com" which is the fully qualified domain name of a server. Another example of a URL is http://www.ibm.com/stories/story1.html. In this example, "/stories/story1.html" is a pathname, which leads to a particular file on the "www.ibm.com" server.

In order for a client to be connected with a desired machine, the alphanumeric computer name (i.e. domain name) used by the client must be converted, or translated, to the machine's Internet address. One prior art method for converting a computer name to an Internet address is the use of a table, such as the /etc/hosts file used on UNIX systems (UNIX is a registered trademark of the Open Group in the United States and other countries). However, because network systems change rapidly, static tables are often out of date.

Another method used for converting a computer name to an Internet address is the use of a name server. A name server is a server which is available to all clients on the network. The purpose of a name server is to translate, or convert, computer names to Internet addresses. A name server is kept up to date with the latest information regarding all machines on the network. However, there are several problems associated with the use of name servers. If a name server is very busy or has gone off line for some reason, then a client trying to reach a particular machine will be prevented from connecting with that machine (unless the user knows the machine's Internet address, which is unlikely). It is possible to configure a client machine so that it uses a static table (e.g., /etc/hosts) if the name server does not respond. However, as discussed above, static tables may quickly become out of date.

Another problem with the use of name servers is that it takes time, especially when the name server is very busy, to obtain an Internet address from the name server. Some name servers are made up of a hierarchy of name servers. Thus, if a first name server does not find an address for a particular computer name, the name is sent to a second name server, and so on. Each upward search takes additional time. Further, clients tend to connect to the same machine many times. However, each time a client connects to a machine, even if the client has recently connected to the same machine, the client must go through the name server and obtain a computer name to Internet address conversion.

Consequently, it would be desirable to have a system and method for quickly obtaining an Internet address for a machine. It would also be desirable to be able to obtain an Internet address for a machine even when the name server is off line.

SUMMARY OF THE INVENTION

Accordingly, the present invention is directed to a system, method, and computer readable medium for saving and reusing recently acquired Internet addresses. When a client computer receives an Internet address for a particular computer name, the computer name and its corresponding Internet address are saved in a client memory area. Before sending a request to a name server, the client memory is checked to determine if the desired computer name and corresponding Internet address are stored in the client memory. If so, the stored Internet address is used to access the desired machine. If the desired computer name and corresponding Internet address are not stored in the client memory, the requested computer name is sent to the name server for conversion. The name server passes the Internet address back to the client, where it is used to access the machine, and is also stored in the client memory for future use.

The client memory area may be configured to flush itself completely at user-designated intervals. This ensures that "stale" names are not stored for an overly long period of time. Alternately, the client memory area may be configured as a queue. After a certain number of name/address pairs are stored, each new name/address pair stored results in the oldest pair being discarded. Another option is that each name/address pair may be stored with an "expiration time." If the name/address pair is found in the memory area, but the expiration time has passed, a request will be sent to the name server in order to get the most recent Internet address available for the computer name.

The client memory area may also be implemented with a lock feature. If the client determines that the name server is unavailable (i.e. off line), the memory area may be "locked," so that no name/address pairs are discarded. Thus, the name/address pairs in the memory area would continue to be available to the client until the name server is back on line. If the name/address pairs have been stored with expiration times, the expiration times may be reset (so that they will continue to be used) if the client determines that the name server is unavailable. In addition, each user may have his or her own private memory area where only that user's name/address pairs are stored, and thus name/address pairs are stored in individual user memory areas, rather than a client memory area.

An advantage of the present invention is that up-to-date Internet addresses are obtained in a very efficient manner. A further advantage of the present invention is that a client may continue to use stored Internet addresses, and thus access desired computers, even when the name server is off line.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
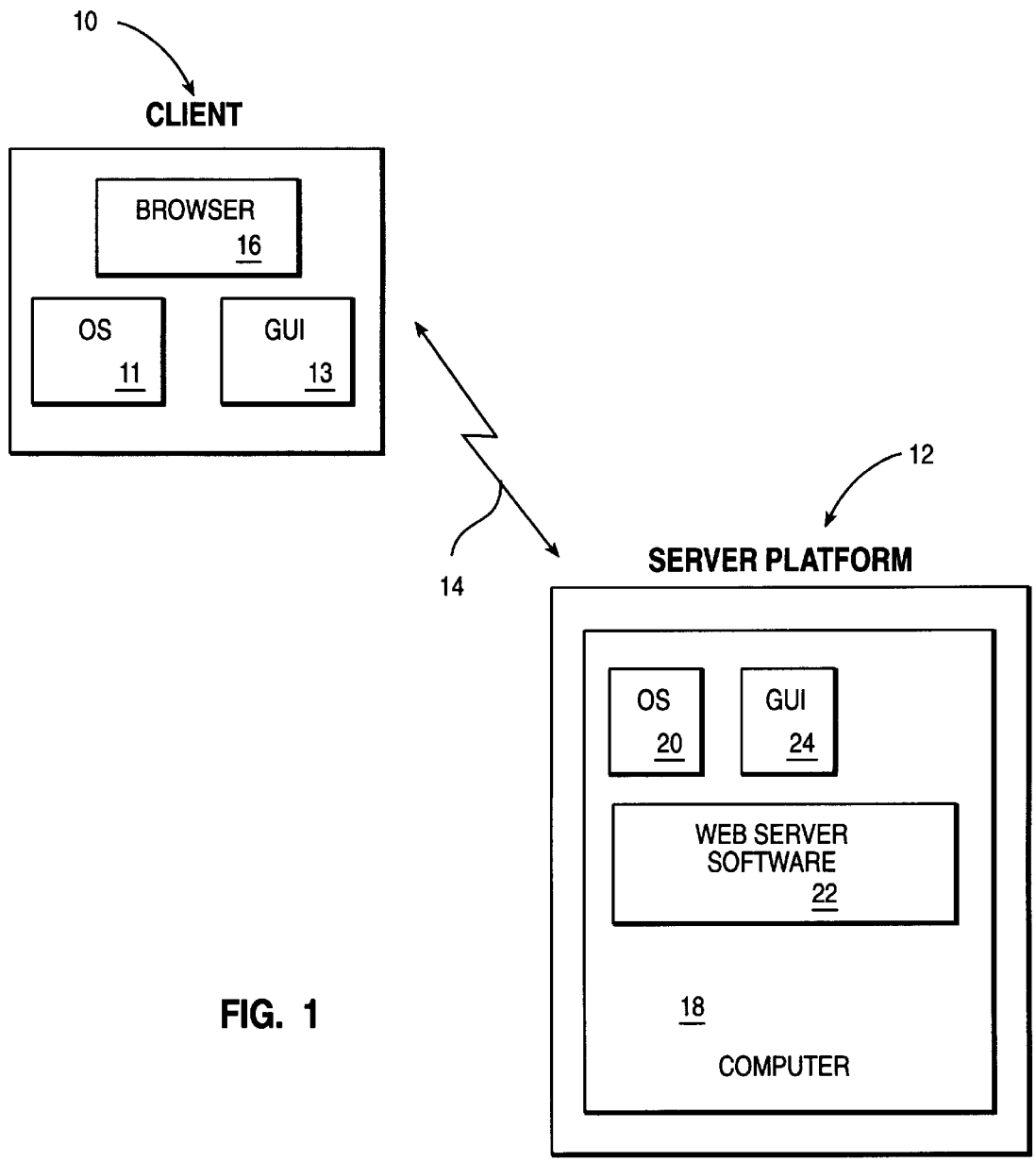
FIG. 1 depicts a network system on which the present invention may be implemented.

A representative system in which the present invention is implemented is illustrated in FIG. 1. A client machine 10 is connected to a Web server platform 12 via a communication channel 14. For illustrative purposes, channel 14 is the Internet, an intranet or other known network connection. Web server platform 12 is one of a plurality of servers which are accessible by clients, one such client being illustrated by machine 10. A representative client machine includes an operating system 11, a graphical user interface 13, and a browser 16. A browser is a known software tool used to access the servers of a network, such as the Internet. Representative browsers include, among others, Netscape Navigator, Microsoft Internet Explorer or the like, each of which are "off-the-shelf" or downloadable software programs. The Web server platform (sometimes referred to as a "Web" site) supports files in the form of hypertext documents and objects.

A representative Web server platform 12 comprises an IBM RISC System/6000 computer 18 running the AIX (Advanced Interactive Executive) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, *RISC System 6000, 7013 and 7016 POWERstation and POWERserver Hardware Technical Reference,* Order No. SA23-2644-00. AIX OS is described in *AIX Operating System Technical Reference,* published by IBM Corporation, First Edition (November 1985), and other publications. While the above platform is useful, any other suitable hardware/operating system/Web server combinations may be used.

When a user wishes to connect to a particular machine, such as a Web server, the user typically requests access by specifying the name of the desired machine. The server name is passed to a name machine for conversion to an Internet address. The Internet address is then passed back to the client, and the client accesses the desired machine by using the Internet address.

The present invention is a system and method for saving computer names, along with their corresponding Internet addresses, in client memory. Before sending a request to a name server, the client memory is checked to determine if the desired computer name and corresponding Internet address are stored in the client memory. If so, the stored Internet address is used to access the desired machine. If the desired computer name and corresponding Internet address are not stored in the client memory, the requested computer name is sent to the name server for conversion. The name server passes the Internet address back to the client, where it is used to access the machine, and is also stored in the client memory for future use.

The memory area may be configured to flush itself completely at user-designated intervals. This ensures that "stale" names are not stored for an overly long period of time. Alternately, the memory area may be configured as a queue. After a certain number of name/address pairs are stored, each new name/address pair stored results in the oldest pair being discarded. Another option is that each name/address pair may be stored with an "expiration time." If the name/address pair is found in the memory area, but the expiration time has passed, a request will be sent to the name server in order to get the most recent Internet address available for the computer name.

The memory area may also be implemented with a lock feature. If the client determines that the name server is unavailable (i.e. off line), the memory area may be "locked," so that no name/address pairs are discarded. Thus, the name/address pairs in the memory area would continue to be available to the client until the name server is back on line. If the name/address pairs have been stored with expiration times, the expiration times may be reset (so that they will continue to be used) if the client determines that the name server is unavailable.

In the case of the World Wide Web, a client specifies a link via a URL. The URL contains a domain name, which is sent to a data query service, such as the Domain Name System (DNS). DNS is a distributed, data query service which converts fully qualified domain names into Internet addresses (i.e. IP addresses in "dot" format). DNS typically executes on a name server machine or machines. For illustrative purposes, the present invention will be described with reference to using DNS to convert a fully qualified domain name to an Internet address (i.e. IP address). However, the present invention may be implemented in any type of network environment where a name server is used to convert or translate a computer name to an Internet address.

Figure 2:
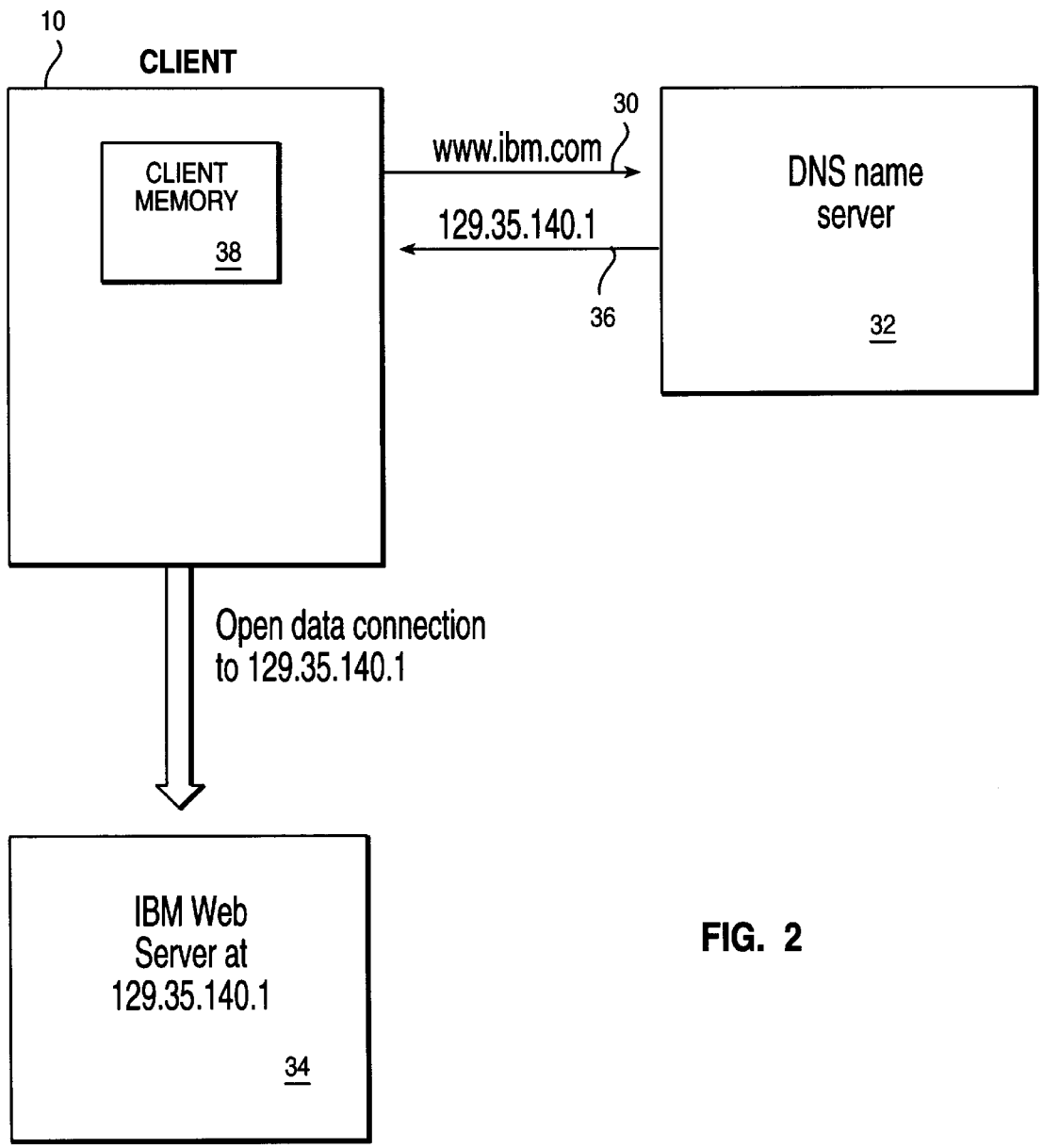
FIG. 2 is a block diagram showing further details of selected components of a network system implementing the present invention.

Referring now to FIG. 2, a block diagram showing selected components of a network system implementing the present invention will now be described. Client 10 specifies a link via a URL, such as "http://www.ibm.com/." Domain name 30, in this case, "www.ibm.com," is the requested computer name. Note that often a Web page is hosted on more than one Web server, and thus there may be several valid Internet addresses corresponding to the same computer name. Also, note that often DNS is configured to use a sequence of name servers until a match is found. Certain computer names may not be found on every DNS name server. In addition, different DNS name servers may return different Internet addresses for the same computer name, along with a time period for which the Internet address is valid. For illustrative purposes, the example shown in FIG. 2 depicts one DNS name server 32 and one IBM Web server 34. However, this is not meant to limit the invention. Those skilled in the art will appreciate that the invention may be practiced in a network environment utilizing more than one Internet address for a single computer name, and in a network environment where the name server function is actually distributed among more than one name server.

Still referring to FIG. 2, requested domain name 30 is checked against the list of computer names in client memory area 38. If domain name 30 is stored in client memory area 38, its corresponding Internet address is used to access the desired machine. If domain name 30 is not found in client memory area 38, it is passed to DNS name server 32. DNS name server 32 converts "www.ibm.com" to its corresponding Internet address 36, in this case 129.35.140.1. Internet address 36 is returned to client 10, where it is used to access Web server 34, and is also stored in client memory area 38. As discussed above, client memory area 38 contains a list of computer names, along with their corresponding Internet addresses.

Figure 3:
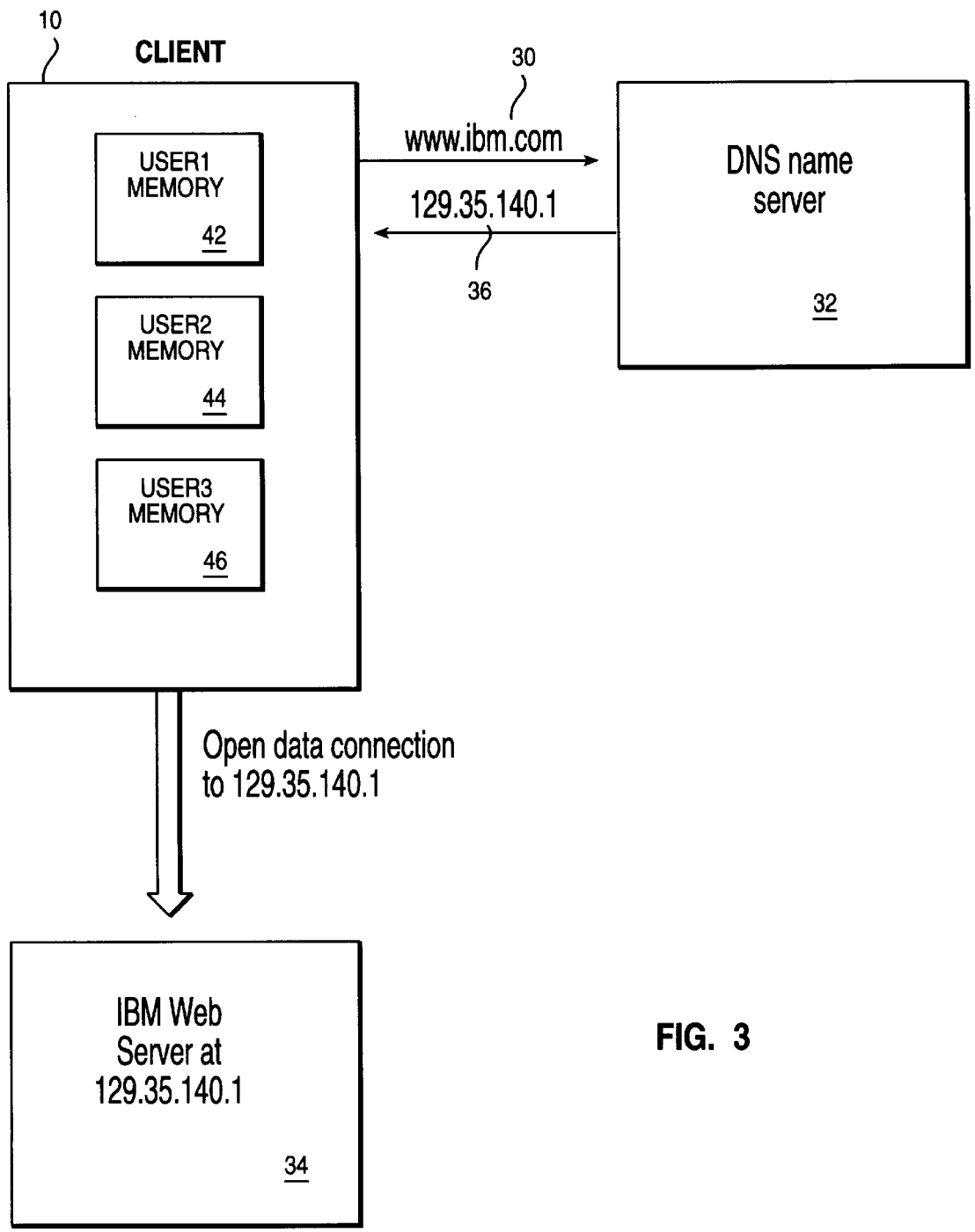
FIG. 3 is a block diagram of an alternative embodiment of a network system implementing the present invention.

An alternate embodiment is depicted in FIG. 3. Referring now to FIG. 3, note that client 10 contains several user memory areas 42, 44, 46 for storing computer name/address pairs. Rather than storing all name/address pairs in one client memory area, as depicted in FIG. 2, each user may have his or her own private memory area where only that user's name/address pairs are stored. Those skilled in the art will appreciate that name/address pairs may be stored in a variety of memory areas, such as a department memory area, a project memory area, etc.

Figure 4:
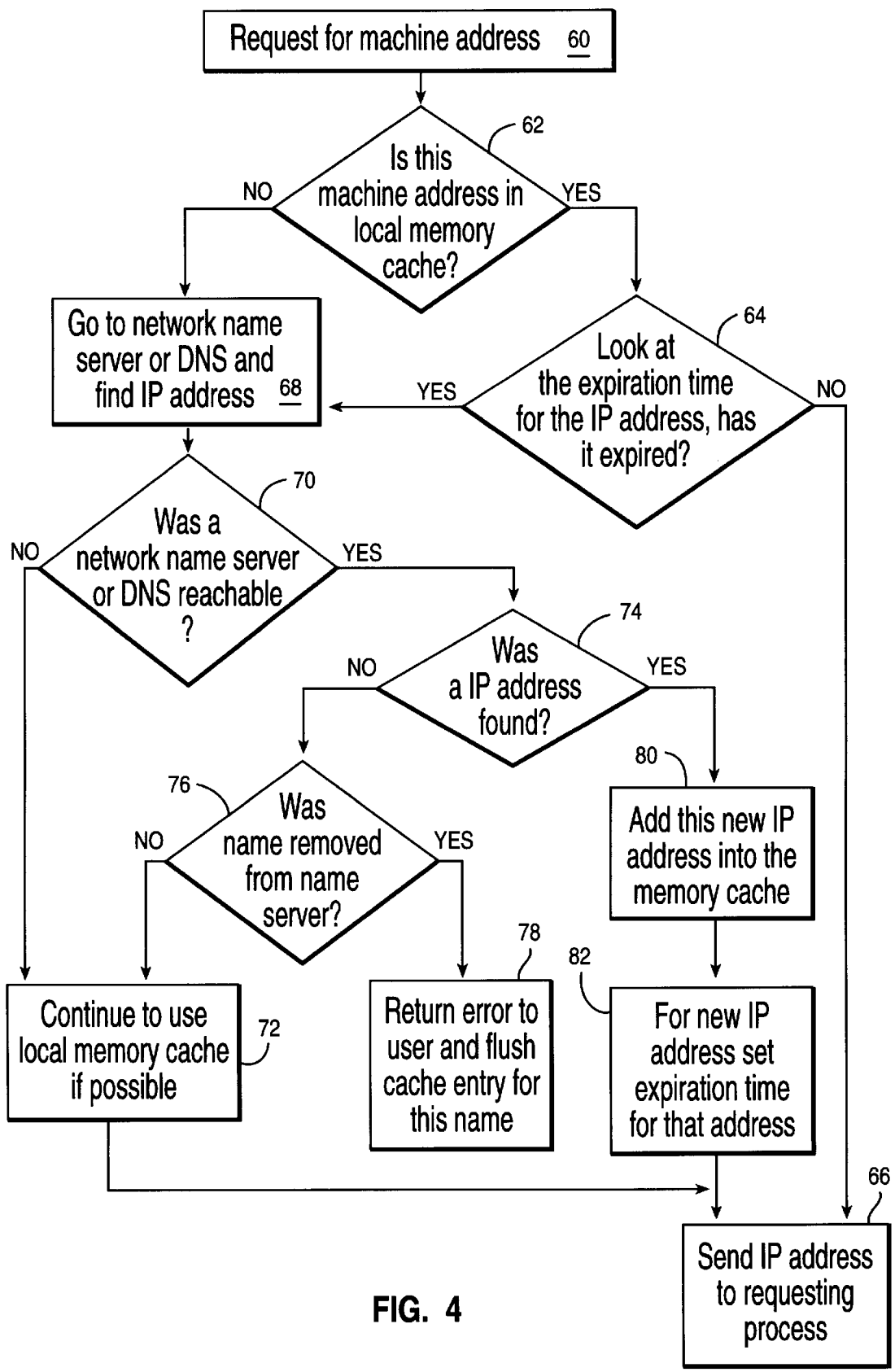
FIG. 4 is a flow chart depicting a method of accessing a desired machine according to the teachings of the present invention.

Referring now to FIG. 4, a method of accessing a desired machine will now be described. In the example shown in FIG. 4, name/address pairs are stored in a single client memory (as depicted in FIG. 2), and are stored along with expiration times. A user, application program, or process determines that it needs to access a particular machine (step 60). The client memory area is searched to determine if the computer name/address is stored in the client memory area (step 62). If it is, the expiration time is checked to see if the currently stored address has expired (step 64). If the address has not expired, it is used by the requesting process to access the requested machine (step 66).

If the requested computer name is not found in the client memory area, or if the Internet address has expired, an address request is sent to a network name server or DNS name server (step 68). If the network name server or DNS name server does not respond (step 70), the client memory area may continue to be used, if possible (step 72). The client memory area may be "locked" and used "as is" until the network name server or DNS name server is back on line.

If the network name server or DNS name server does respond, it may or may not find the requested Internet address (step 74). There are usually two reasons why a name server or DNS server does not return a valid Internet address. The first is that the requested computer name and corresponding Internet address have been removed from the name server (e.g., when a computer is removed from the network). Another reason is simply that the name server or DNS server times out. A check is made to determine if the computer name has been removed from the network (step 76). This is typically indicated by a particular return code from the name server or DNS server. If the computer has been removed from the network, an error is returned to the user, and the entry is flushed from the client memory area (step 78). If the requested name has not been removed from the network, but the name server or DNS server has simply timed out while trying to find the name, then the Internet address stored in the client memory area will be used (step 72).

If a valid Internet address is returned (i.e. the answer to the questions in steps 70 and 74 are both "yes"), then the new Internet address is added to the client memory area (step 80), along with an expiration time (step 82). Note that if the client memory area is full, a least recently used Internet address may be discarded from the client memory area. The Internet address is then sent to the requesting user process (step 66), and the desired machine is accessed using the Internet address.

Figure 5:
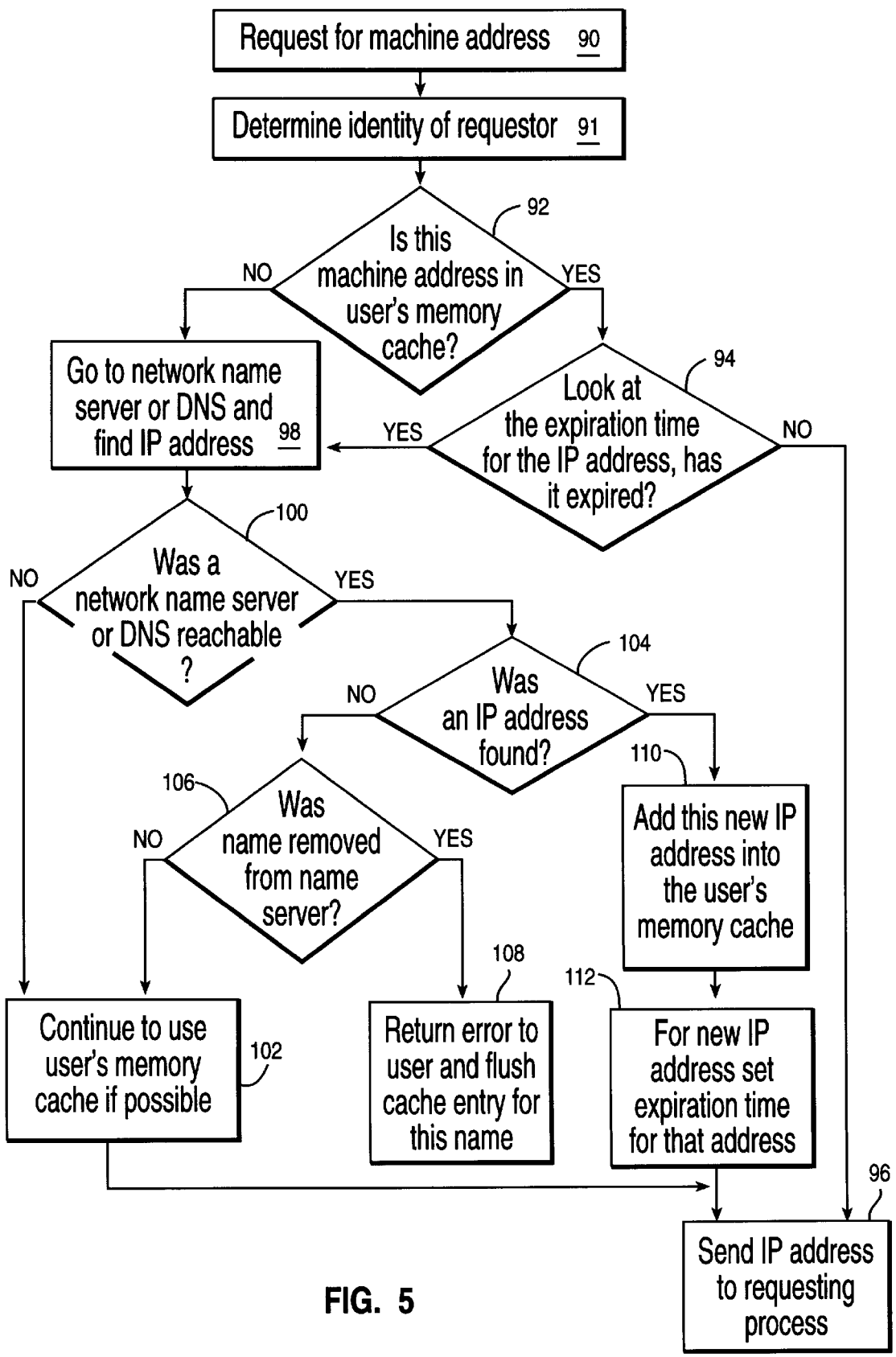
FIG. 5 is a flow chart depicting an alternate method of accessing a desired machine according to the teachings of the present invention.

Referring now to FIG. 5, a flow chart depicting an alternate embodiment will now be described. The steps depicted in FIG. 5 are similar to the steps described in FIG. 4. However, computer names and corresponding Internet addresses are stored in separate, user memory areas (as depicted in FIG. 3). A user program or process requests an Internet address (step 90). The user ID of the user making the request is determined (step 91). The remainder of the steps in FIG. 5 are identical to the steps described in FIG. 4, except that steps 92, 94, 102, 106, 108, 110, and 112 refer to the individual user's memory area, rather than the client memory area.

The user memory area of the user making the request is searched to determine if the computer name/address is stored in the user memory area (step 92). If it is, the expiration time is checked to see if the currently stored address has expired (step 94). If the address has not expired, it is used by the requesting process to access the requested machine (step 66).

If the requested computer name is not found in the user memory area, or if the Internet address has expired, an address request is sent to a network name server or DNS name server (step 98). If the network name server or DNS name server does not respond (step 100), the user memory area may continue to be used, if possible (step 102). The user memory area may be "locked" and used "as is" until the network name server or DNS name server is back on line. If the network name server or DNS name server does respond, it may or may not find the requested Internet address (step 104). If it does not return a valid Internet address, a check is made to determine why a valid Internet address was not found (step 106). If the requested name was removed from the name server or DNS server, an error is returned to the user, and the entry is flushed from the user memory area (step 108). If the name server or DNS server has timed out while trying to find the requested name, then the Internet address stored in the user memory area will be used (step 102).

If a valid Internet address is returned (i.e. the answer to the questions in steps 100 and 104 are both "yes"), then the new Internet address is added to the user memory area (step 110), along with an expiration time (step 112). Note that if the user memory area is full, a least recently used Internet address may be discarded from the user memory area. The Internet address is then sent to the requesting user process (step 96), and the desired machine is accessed using the Internet address.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method, for use in a client, for accessing a desired computer, comprising the steps of:

searching a client memory area, containing a plurality of computer names and corresponding Internet addresses, for a computer name of the desired computer;

if the computer name is found, accessing the desired computer using the corresponding Internet address;

if the computer name is not found, performing the following:

passing the computer name from the client to a name server for conversion;

receiving a returned Internet address from the name server; and storing the returned Internet address, as the corresponding Internet address, along with the computer name of the desired computer and an expiration time, in the client memory area.

2. A method according to claim 1, further comprising the steps of:

determining, based on the expiration time stored with the computer name and the corresponding Internet address, if the Internet address has expired; and if the Internet address has expired, passing the computer name of the desired computer from the client to the name server for conversion.

3. A method according to claim 2, further comprising the steps of:

determining if the name server is off line; and if the name server is off line, resetting the expiration time stored with the computer name and the corresponding Internet address.

4. A method according to claim 1, wherein the client memory area includes one or more user memory areas, and said searching step comprises the steps of:

identifying a user requesting the desired computer; and searching a user memory area associated with the identified user, containing a plurality of computer names and corresponding Internet addresses, for the computer name of the desired computer.

5. A method according to claim 4, wherein said storing step further comprises the step of:

storing the returned Internet address, as the corresponding Internet address, along with the computer name of the desired computer and an expiration time, in the user memory area associated with the identified user.

6. An information handling system, comprising:

a plurality of computers, including at least one client computer, connected by a network, each computer having a computer name and a corresponding Internet address;

a client memory area, in each client computer, containing a plurality of computer names and corresponding Internet addresses;

a name server, for converting computer names to Internet addresses;

means for requesting, by a requesting client computer, connection to a desired computer;

means for searching the client memory area in the requesting client computer, for the Internet address corresponding to the computer name of the desired computer;

means for accessing the desired computer using the corresponding Internet address found in the client memory area;

means for passing the computer name of the desired computer from the client to a name server for conversion to a corresponding Internet address;

means for receiving a returned Internet address from the name server; and means for storing the returned Internet address, as the corresponding Internet address, along with the computer name of the desired computer and an expiration time, in the client memory area.

7. An information handling system according to claim 5, further comprising:

means for determining, based on the expiration time stored with the computer name and the corresponding Internet address, if the Internet address has expired; and means for passing the computer name of the corresponding expired Internet address from the client to the name server for conversion.

8. An information handling system according to claim 7, further comprising:

means for determining if the name server is off line; and means for resetting the expiration time stored with the computer name and the corresponding Internet address.

9. An information handling system according to claim 6, wherein the client memory area includes one or more user memory areas, and said means for searching comprises:

means for identifying a user requesting the desired computer; and means for searching a user memory area associated with the identified user for the computer name of the desired computer.

10. An information handling system according to claim 9, wherein said means for storing further comprises:

means for storing the returned Internet address, as the corresponding Internet address, along with the computer name and an expiration date, in the user memory area associated with the identified user.

11. A computer readable medium for connecting a client to a desired computer, comprising:

means for searching a client memory area, containing a plurality of computer names and corresponding Internet addresses, for the computer name of the desired computer;

means for accessing the desired computer using the Internet address corresponding to the computer name of the desired computer found in the client memory area;

means for passing the computer name of the desired computer from the client to a name server for conversion to a corresponding Internet address;

means for receiving a returned Internet address from the name server; and means for storing the returned Internet address, as the corresponding Internet address, along with the computer name of the desired computer and an expiration time, in the client memory area.

12. A computer readable medium according to claim 11, further comprising:

means for determining, based on the expiration time stored with the computer name and the corresponding Internet address, if the Internet address has expired; and means for passing the computer name corresponding to an expired Internet address from the client to the name server for conversion.

13. A computer readable medium according to claim 12, further comprising:

means for determining if the name server is off line; and means for resetting the expiration time stored with the computer name and the corresponding Internet address.

14. A computer readable medium according to claim 11, wherein the client memory area includes one or more user memory areas, and said means for searching comprises:

means for identifying a user requesting the desired computer name; and means for searching a user memory area associated with the identified user for the computer name of the desired computer.

15. A computer readable medium according to claim 14, wherein said means for storing further comprises:

means for storing the returned Internet address, as the corresponding Internet address, along with the computer name of the desired computer and an expiration time, in the user memory area associated with the identified user.

* * * * *